United States Patent [19]

Morino et al.

[11] Patent Number: 4,531,194

[45] Date of Patent: Jul. 23, 1985

[54] TAPE RECORDER DRIVE SYSTEM IN A PROGRAMMABLE ELECTRONIC CALCULATOR

[75] Inventors: Masuaki Morino, Soraku; Yoshiyuki Fujikawa; Isamu Haneda, both of Nara; Tetsuo Myoi, Soraku, all of Japan

[73] Assignee: Sharp Kabushiki Kaisha, Osaka, Japan

[21] Appl. No.: 440,303

[22] Filed: Nov. 9, 1982

[30] Foreign Application Priority Data

Nov. 11, 1981 [JP] Japan ................................. 56-181358

[51] Int. Cl.$^3$ ........................... G06F 3/06; G06F 3/16
[52] U.S. Cl. .................................................. 364/705
[58] Field of Search ................................. 364/705, 706

[56] References Cited

U.S. PATENT DOCUMENTS 4,049,955 9/1977 Harris et al. ......................... 364/705
4,120,037 10/1978 Sato ..................................... 364/705
4,237,540 12/1980 Sato ..................................... 364/705
4,396,941 8/1983 Nishimura et al. ................. 364/705

Primary Examiner—David H. Malzahn
Attorney, Agent, or Firm—Birch, Stewart, Kolasch & Birch

[57] ABSTRACT

A programmable electronic calculator includes two cassette tape recorders as peripheral system. An optional program or a data processed by the programmable electronic calculator is introduced into and recorded on a first cassette tape recorder. The first cassette tape recorder reproduces the optional program recorded therein upon request from the programmable electronic calculator. A second cassette tape recorder carries an audible message for operation guidance purposes. An interface circuit is provided in the programmable electronic calculator for independently controlling the operation of the first and second cassette tape recorders.

5 Claims, 6 Drawing Figures

TAPE RECORDER DRIVE SYSTEM IN A PROGRAMMABLE ELECTRONIC CALCULATOR

BACKGROUND AND SUMMARY OF THE INVENTION

The present invention relates to a programmable electronic calculator and, more particularly, to a programmable electronic calculator which includes a plurality of tape recorders as outer memories.

A programmable electronic calculator or a portable, personal computer has been developed, which includes a tape recorder as an outer memory for storing a program or data. The programmable electronic calculator includes a control system for driving the tape recorder in order to conduct the read operation and/or the write operation of the program and the data into and from the tape recorder.

However, in the conventional programmable electronic calculator, the programmable electronic calculator does not store the command for controlling the tape drive except for the read operation and/or the write operation of the program or the data.

Accordingly, an object of the present invention is to provide a programmable electronic calculator which includes a control system for driving a tape recorder which is connected to the programmable electronic calculator as an outer memory.

Another object of the present invention is to provide a tape drive control system in a programmable electronic calculator, which independently drives a plurality of tape recorders connected to the programmable electronic calculator.

Other objects and further scope of applicability of the present invention will become apparent from the detailed description given hereinafter. It should be understood however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, at least two tape recorders are connected to the programmable electronic calculator.

The programmable electronic calculator stores commands for driving the tape recorders, which are applied to the tape recorders via an interface circuit. A first tape recorder functions as an outer memory of the programmable electronic calculator for storing a program or data processed by the programmable electronic calculator. A second tape recorder functions as a reproduction device for providing audible guidance for the respective steps of the operation, if required.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
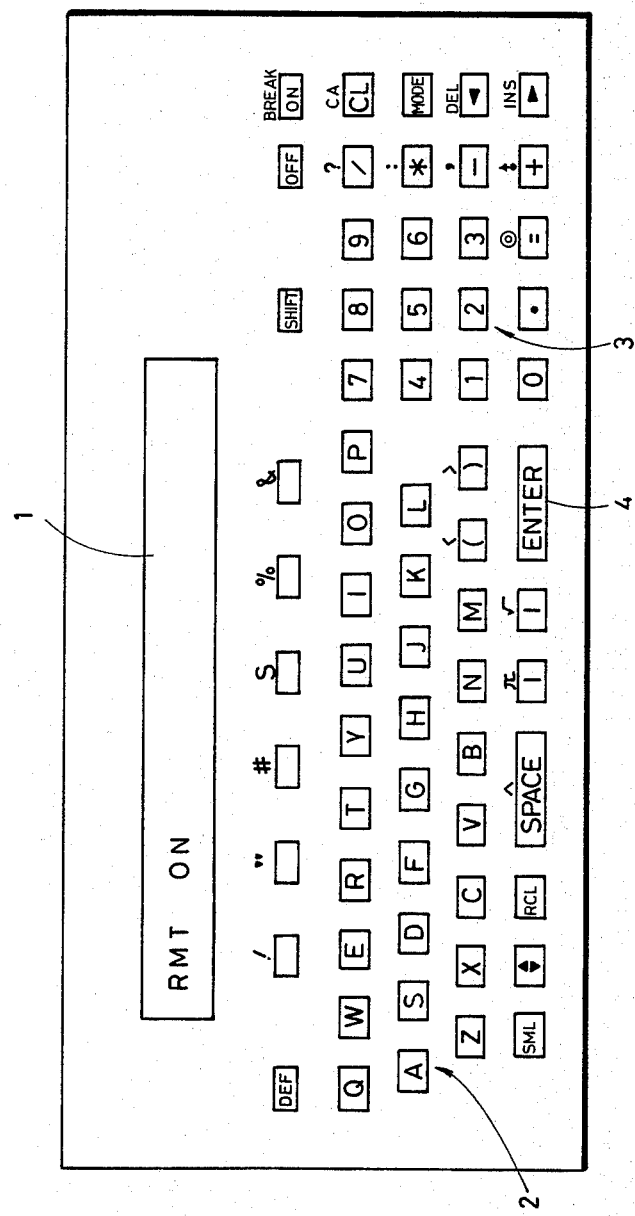
FIG. 1 is a plan view of an embodiment of a programmable electronic calculator of the present invention.

A programmable electronic calculator includes a display panel 1 made of a liquid crystal display panel of the dot matrix type. Character keys 2 and numeral keys 3 are provided for introducing various commands and data into the programmable electronic calculator. An enter key 4 controls the execution of the operation. That is, when the enter key 4 is actuated after a desired command is introduced through the use of the character keys 2 and the numeral keys 3, the program related to the command is executed.

A plurality of tape recorders can be connected to the programmable electronic calculator as peripheral systems via an interface circuit which will be described later.

The programmable electronic calculator includes a display control circuit 11 for controlling the display on the display panel 1. A key input circuit 12 is associated with various keys provided on the input panel of the programmable electronic calculator. The key input circuit 12 receives a key strobe signal developed from an input/output port 13, and the key input circuit 12 develops a key return signal which is applied to a microprocessor unit 14. The programmable electronic calculator further includes read/write memories (RAM) 15 which function as various registers and flags for storing various data and programs. Read only memories (ROM) 16 store control programs and interpreters for executing programs. A connector 17 is provided for connecting the programmable electronic calculator to outer memories, if required.

The read/write memories (RAM) 15, the read only memories (ROM) 16 and the above-mentioned outer memories are connected to an address bus 18, a data bus 19 and a control bus 20. The above-mentioned input/output port 13 is also connected to the address bus 18, the data bus 19 and the control bus 20, and functions as an interface for the microprocessor unit 14.

The programmable electronic calculator further includes a buzzer 21 which is activated by a driver circuit 22. A clock circuit 23 associated with a crystal oscillator 24 is provided. The above-mentioned input/output port 13 further functions to control signal transmission between the main control circuit and the clock circuit 23 and the driver circuit 22. The clock circuit 23 stores the time information data. Another connector 25 is provided for connecting the programmable electronic calculator to optional units such as a data recorder, a printer and a floppy disc.

The microprocessor unit 14 develops a synchronization signal HA and an ON/OFF signal DISP which are applied to the display control circuit 11. The microprocessor unit 14 further develops back plate signals $H_0$ through $H_7$ which are applied to the display panel 1. The display control circuit 11 includes a display memory (not shown), each bit of the display memory corresponding to each segment included in the display panel 1. That is, a desired pattern is displayed on the display panel 1 when a desired bit pattern is written into the display memory included in the display control circuit 11.

Figure 3:
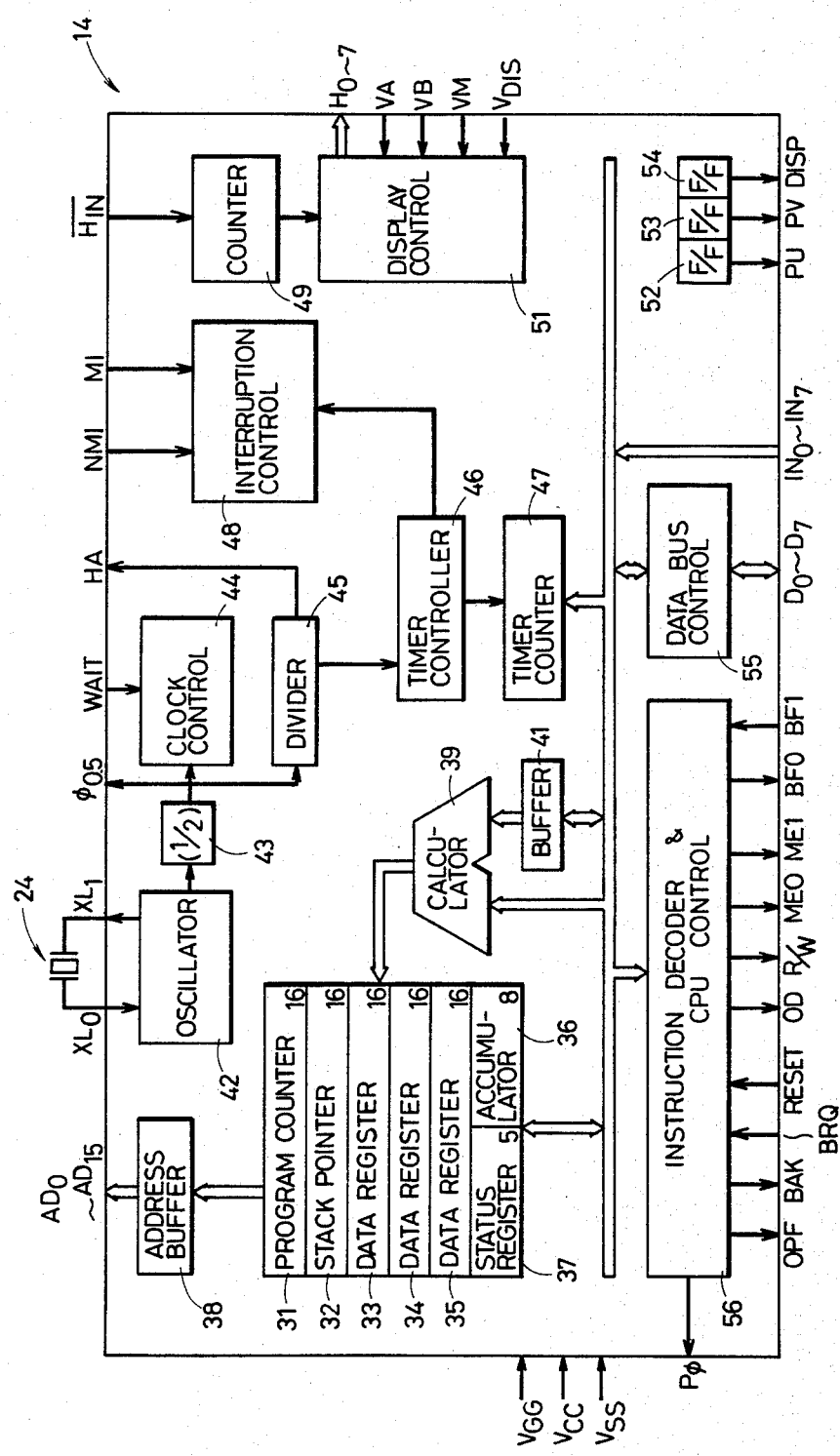
FIG. 3 is a block diagram of a microprocessor unit included in the programmable electronic calculator of FIGS. 1 and 2.

FIG. 3 shows a detailed construction of the microprocessor unit 14.

The microprocessor unit 14 includes a program counter 31 of 16-bit construction. The program counter 31 is a register of 16-bit construction, and functions to store the address data next to the command now executed by the microprocessor unit 14. The contents stored in the program counter 31 are increased by one when the next command is fetched. A stack pointer 32 is a register of 16-bit construction, and functions to indicate the address of the stack which should be selected in the push-down operation or the pop-up operation of the memories. Data registers 33, 34 and 35 are registers of 16-bit construction. The data registers 33, 34 and 35 function not only as the data registers but also as the data pointers. An accumulator 36 functions to store the calculation results, and functions as a buffer register for conducting the data transfer between the outer memory and the main body of the programmable electronic calculator. A status register 37 memorizes various conditions such as a carry, borrow, zero and overflow in the arithmetic calculation operation.

An address buffer circuit 38 is connected to the address bus $AD_0$ through $AD_{15}$. The microprocessor unit 14 further includes an arithmetic calculation circuit 39 and a buffer circuit 41 for arithmetic calculation purposes. An oscillator circuit 42 includes terminals $XL_0$ and $XL_1$ which are connected to the crystal oscillator 24. A frequency divider ($\frac{1}{2}$) 43 is connected to receive the output signal of the oscillator circuit 42, and an output signal of the frequency divider ($\frac{1}{2}$) 43 is applied to a clock control circuit 44. The clock control circuit 44 controls the development of the timing signals in response to a timing control signal (WAIT) applied thereto. Another frequency divider 45 is connected to receive the output signal of the frequency divider ($\frac{1}{2}$) 43. The output signal of the frequency divider 45 is applied to the display control circuit 11 as the synchronization signal HA. The output signal of the frequency divider 45 is also applied to a timer controller 46. The timer controller 46 controls the count operation and the interruption operation of a timer counter 47. The timer counter 47 is a polynomial counter of 9-bit construction and functions to count a time interval for timer interruption.

An interruption control circuit 48 controls the interruption operation in accordance with the interruption request introduced through terminals NMI and MI and the signal developed from the timer controller 46. A counter 49 is provided for developing the back plate signal which is applied to the display panel 1. An input signal $\overline{H_{IN}}$ of the counter 49 is normally connected to the synchronization signal HA. A display control circuit 51 receives display drive voltages $V_{DIS}$, $V_A$, $V_B$ AND $V_M$, and develops the back plate signals $H_0$ through $H_7$. The microprocessor unit 14 further includes flip-flops 52 and 53 for optional use, a flip-flop 54 for controlling ON/OFF operation of the display, and a data bus control circuit 55.

Signals introduced through input ports $IN_0$ through $IN_7$ are introduced into and stored in the accumulator 36 as the eight-bit data. The data bus $D_0$ through $D_7$ transfer the data bidirectionally, thereby effecting the data writing operation into the outer memory or the data reading operation from the outer memory. An instruction decoder/CPU control circuit 56 is provided for controlling the system operation. The instruction decoder/CPU control circuit 56 develops various control signals such as a memory write control signal R/W, and memory enable signals $ME_0$ and $ME_1$.

Figure 4:
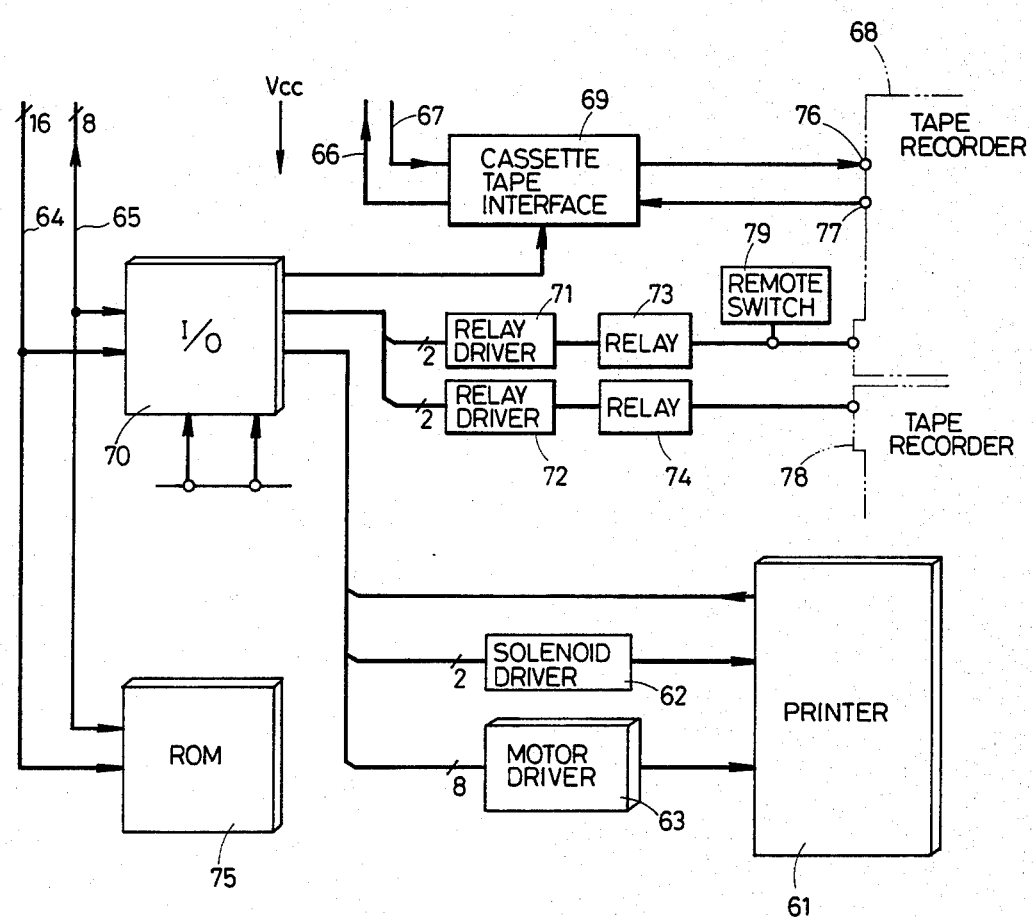
FIG. 4 is a block diagram of an interface circuit included in the programmable electronic calculator of FIGS. 1 and 2.

FIG. 4 shows an interface circuit for achieving the data transfer between the programmable electronic calculator and a tape recorder such as a cassette type magnetic tape recorder.

The interface circuit includes, in addition to the tape recorder interface circuit, a solenoid driver circuit 62 for driving a solenoid (not shown) of a printer 61, and a motor driver circuit 63 for driving X and Y motors (not shown) of the printer 61.

Figure 2:
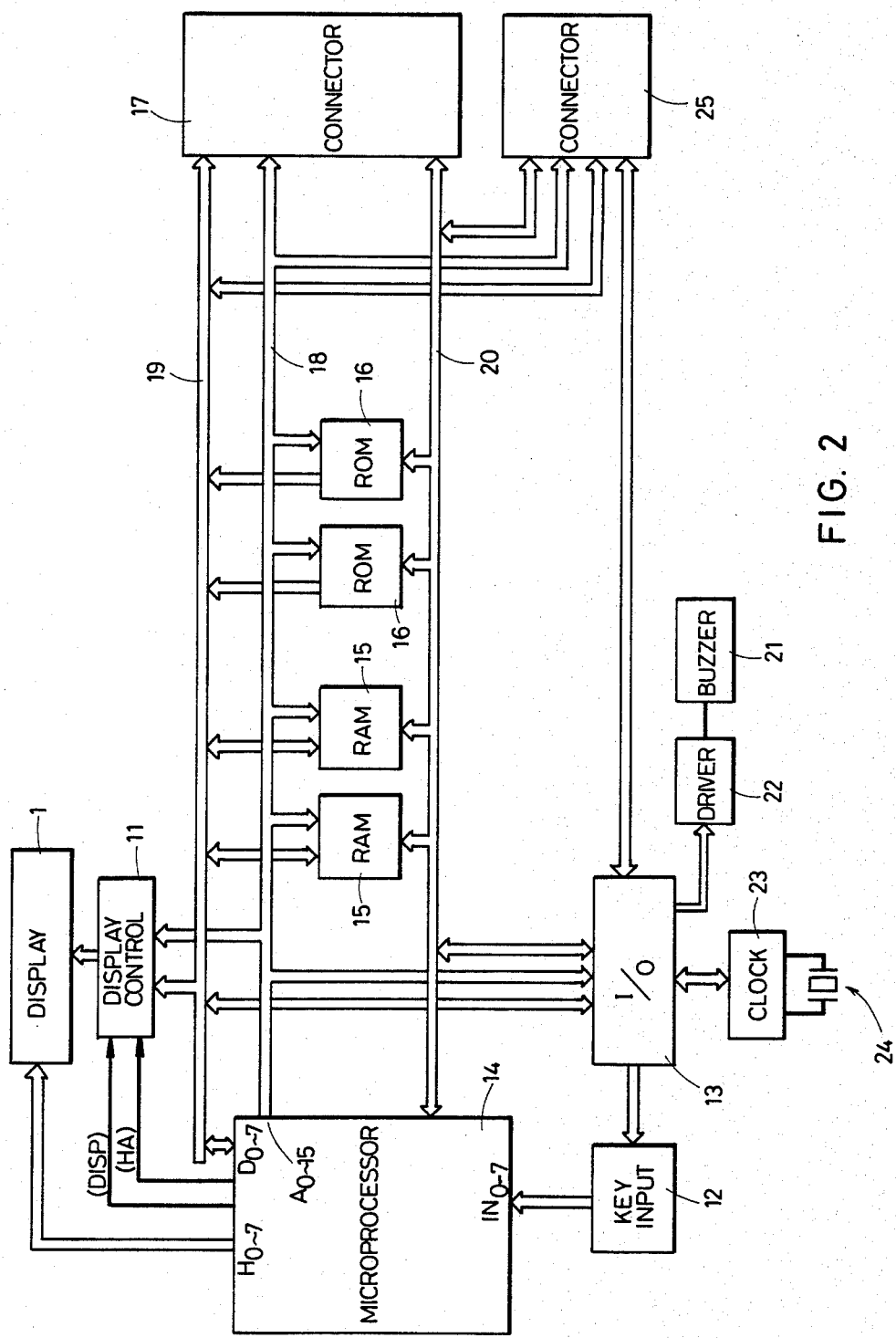
FIG. 2 is a schematic block diagram of the programmable electronic calculator of FIG. 1.

The interface circuit includes an address bus 64, a data bus 65, a cassette tape input signal line 66 and a cassette tape output signal line 67. The address bus 64, the data bus 65, the input signal line 66 and the output signal line 67 are connected to the connector 25 shown in FIG. 2. When a cassette tape recorder 68 is placed in the reproduction mode, a cassette tape input signal, which is serial data, is developed from a cassette tape interface circuit 69 to the cassette tape input signal line 66. A cassette tape output signal, which is serial data, is developed from the main body of the programmable electronic calculator and applied to the cassette tape interface circuit 69 via the cassette tape output signal line 67.

The interface circuit of FIG. 4 further includes an input/output port 70, relay drivers 71 and 72, relays 73 and 74, and a read only memory (ROM) 75. The cassette tape interface circuit 69 functions to modulate or demodulate the serial data. More specifically, the serial signal applied through the cassette tape output signal line 67 is modulated by the cassette tape interface circuit 69, and the modulated signal is applied to a microphone jack 76 of the cassette tape recorder 68. Furthermore, the reproduction signal developed from an earphone jack 77 of the cassette tape recorder 68 is demodulated by the cassette tape interface circuit 69, and the demodulated signal is provided to the cassette tape input signal line 66.

The relay 73 controls a remote signal for the cassette tape recorder 68. The relay 74 controls a remote signal for another cassette tape recorder 78. Relay control signals are developed from the input/output port 70, which are applied to the relay drivers 71 and 72 for controlling the relays 73 and 74, respectively. The remote signal for the cassette tape recorder 68 can be manually developed through the use of a remote manual switch 79.

Figure 5:
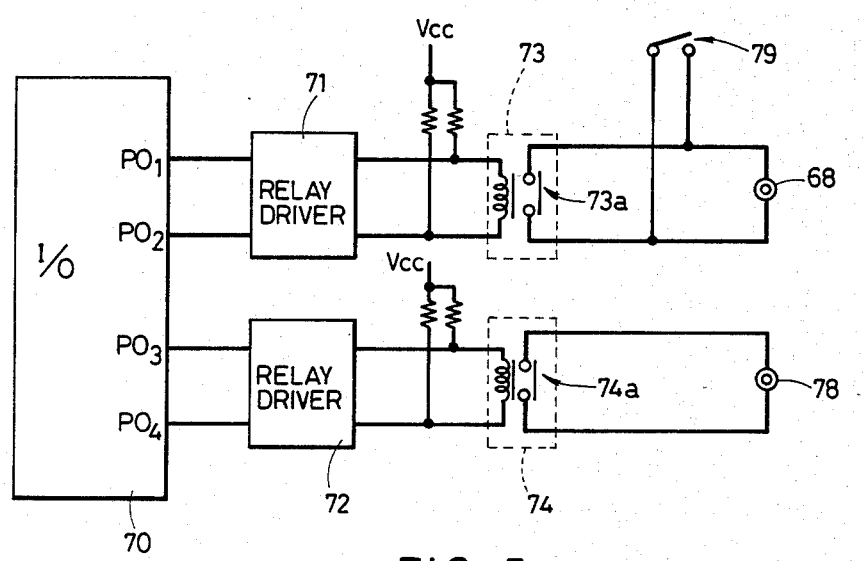
FIG. 5 is a circuit diagram of a tape drive control circuit included in the interface circuit of FIG. 4.

FIG. 5 shows a circuit construction related to the relay drivers 71 and 72, the relays 73 and 74, and the remote manual switch 79.

The relays 73 and 74 are latching type relays. When one-shot pulse of the positive voltage is applied to the relay 73 or 74, a contact 73a or 74a is closed. When one-shot pulse of the negative voltage is applied to the relay 73 or 74, the contact 73a or 74a is opened. When one-shot pulse is applied from an output terminal $PO_1$ of the input/output port 70 to the relay driver 71, the relay driver 71 activates the relay 73 to close and thus turn on the contact 73a. When one-shot pulse is developed from another output terminal $PO_2$ of the input/output port 70, the relay driver 71 functions to open and thus turn off the contact 73a of the relay 73. When one-shot pulse is applied from an output terminal PO$_3$ to the relay driver 72, the relay driver 72 functions to close and thus turn on the contacts 74a of the relay 74. When one-shot pulse is developed from an output terminal PO$_4$ of the input/output port 70, the relay driver 72 functions to open and thus turn off the contact 74a of the relay 74.

Figure 6:
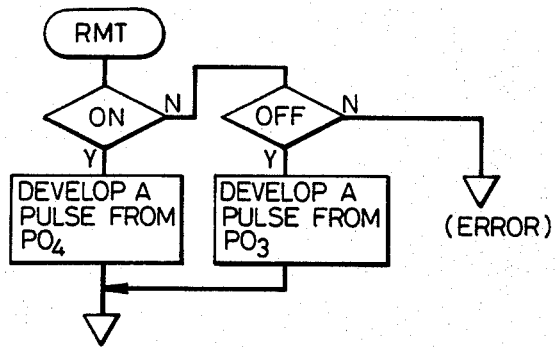
FIG. 6 is a flow chart for explaining an operational mode of the programmable electronic calculator of FIGS. 1 and 2.

FIG. 6 shows an operation flow for driving the cassette tape recorder 78.

When a command "RMT ON" is executed, the one-shot pulse is developed from the output terminal PO$_4$ of the input/output port 70, thereby turning off the contact 74a of the relay 74. Accordingly, the cassette tape recorder 78 is placed in the stop mode. The command "RMT ON" can be incorporated in the program or can be introduced through the use of the character keys 2. When a command "RMT OFF" is executed, the one-shot pulse is developed from the output terminal PO$_3$ of the input/output port 70 for turning on the contact 74a of the relay 74, thereby placing the cassette tape recorder 78 in the normal operational mode such as the recording mode and the reproduction mode.

The cassette tape recorder 68 is driven to operate when a program or data is desired to be written into the cassette tape recorder 68 or when a program or a data is desired to be read out from the cassette tape recorder 68, as is well known in the art.

The cassette tape recorder 78 can be used as an audible guidance source rather than as a data/program memory. That is, guidance messages are recorded on the cassette tape recorder 78, and such recorded guidance messages are reproduced from the cassette tape recorder 78 in response to the above-noted control signal developed from the main body of the programmable electronic calculator. The control signal development can be controlled by the program stored in the programmable electronic calculator. Furthermore, the guidance message can be audible announcements of guidance for operation of the apparatus.

The invention being thus described, it will be obvious that the same may be varied in many ways without departure from the spirit and scope of the invention, which is limited only by the following claims.

What is claimed is:

1. A combined electronic calculator and recorder system comprising:

an electronic calculator comprising data processing means, control means and interfacing means for interfacing said data processing means and control means with at least two recording devices external of said calculator;

at least a first recording device connected to said interfacing means for storing program information and data for said data processing means;

at least a second recording device connected to said interfacing means for recording and outputting operational instructions;

said control means comprising means for independently controlling operation of said first and second recording devices, respectively.

2. The combined electronic calculator and recorder system of claim 1, wherein each of said recording devices comprises a magnetic cassette tape recorder.

3. The combined electronic calculator and recorder system of claim 1, wherein said interfacing means comprises at least two circuits, each of which functions to place the corresponding recording device selectively in a stop mode and an operational mode.

4. The combined electronic calculator and recorder system of claim 1, wherein said second recording device comprises means for outputting audible operational instructions.

5. The combined electronic calculator and recorder system of claim 1, wherein said control means is responsive to program information for independently controlling operation of said first and second recording devices.

* * * * *